(No Model.)
J. R. ANDERSON.
HANGER FOR MIRRORS OF BUREAUS.
No. 401,921. Patented Apr. 23, 1889.
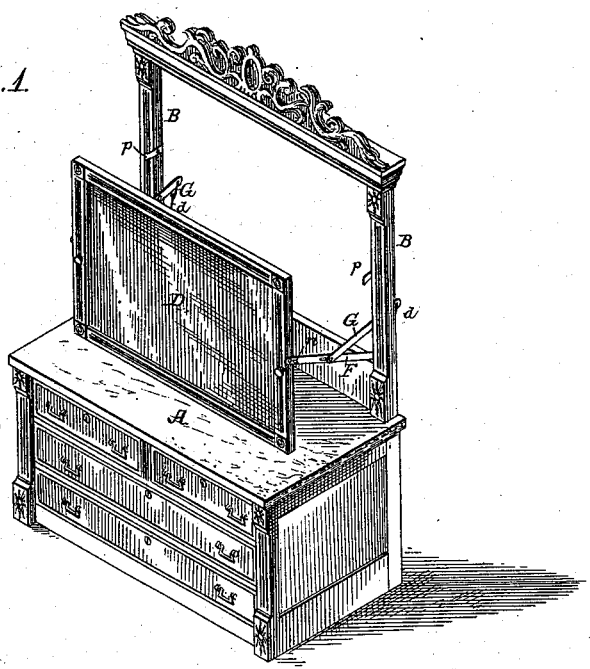
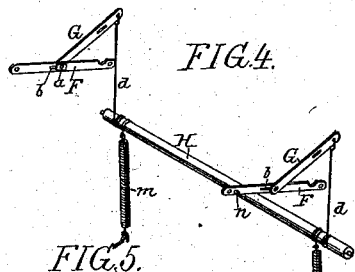
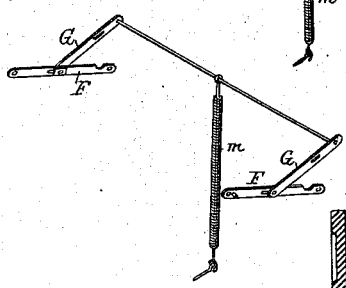
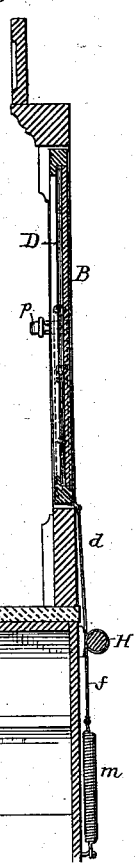
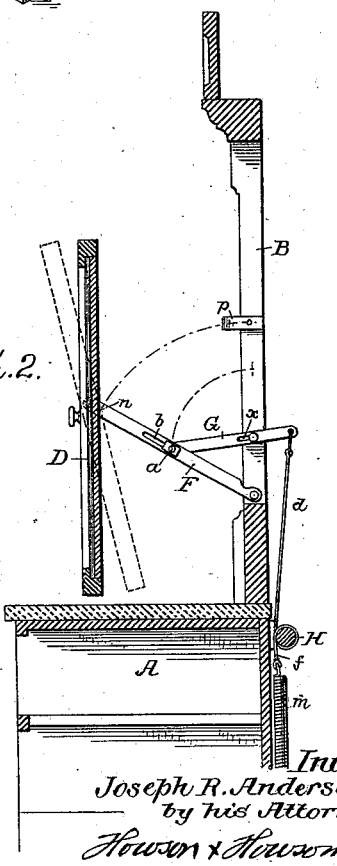
Witnesses:
David S. Williams
Alex Barkoff
Inventor:
Joseph R. Anderson
by his Attorneys
Howson & Howson

UNITED STATES PATENT OFFICE.

JOSEPH R. ANDERSON, OF PHILADELPHIA, PENNSYLVANIA, ASSIGNOR OF TWO-THIRDS TO FRANKLIN B. REEVES AND CHARLES HENRY REEVES, OF SAME PLACE.

HANGER FOR MIRRORS OF BUREAUS.

SPECIFICATION forming part of Letters Patent No. 401,921, dated April 23, 1889.

Application filed October 8, 1888. Serial No. 287,521. (No model.)

*To all whom it may concern:*

Be it known that I, JOSEPH R. ANDERSON, a citizen of the United States, and a resident of Philadelphia, Pennsylvania, have invented certain Improvements in Hangers for Mirrors of Bureaus, &c., of which the following is a specification.

My invention relates to that class of hangers whereby a mirror is hung to the frame of a bureau or dressing-case in such a manner that it can be drawn forward and downward from its position in said frame when desired, the object of my invention being to provide a neat, cheap, and compact hanger of this character. This object I attain in the manner hereinafter set forth, reference being had to the accompanying drawings, in which—

Figure 1 is a perspective view of a bureau with a mirror-hanging device constructed in accordance with my invention. Fig. 2 is a sectional view of the same on a larger scale. Fig. 3 is a similar view showing the mirror in its normal position. Fig. 4 is a perspective view of the hanger on a reduced scale, and Fig. 5 is a like view showing a modified form of hanger.

In Fig. 1, A represents the body of the bureau, and B the fixed frame at the back of the same, this frame having the usual opening for the reception of the mirror D, which is hung to the upper ends of arms F, pivoted at their lower ends to the side bars of the frame B, as shown in Figs. 1 and 2. Hung to said bars some distance above the pivots of the arms F are levers G, which have slots $x$ for the reception of the pivot-pins, and the front ends of these levers have pins $a$, adapted to slots $b$ in the arms F, the rear ends of said levers being connected by cords or chains $d$ to a drum, H, free to turn in suitable brackets on the rear of the bureau, other cords, wires, or chains, $f$, being wound around said drum in a direction the reverse of the cords or chains $d$, and being acted upon by springs $m$, which tend to turn the drum, so as to wind up the cords or chains $d$ thereupon. Normally the mirror occupies its ordinary position in the frame B, as in Fig. 3, and is prevented from accidental dislodgment from this position by the engagement of pins $n$ on the arms F with spring-plates $p$, secured to the opposite side bars of the frame. When, however, it is desired to draw the mirror forward and downward, so as to obtain a view of objects near the floor, the pins may be released from the control of these catches and the mirror drawn forward, the arms F swinging on their pivots, and thereby so swinging the levers G as to draw upon the cords or chains $d$, and thus turn the drum H, so as to wind up the cords or chains $f$ thereon and impart tension to the springs $m$, which thus serve to counterbalance the weight of the mirror.

To prevent the tension of the springs from raising the mirror after it has been drawn forward and released, the levers G are pulled forward to the full extent permitted by the slots $x$, so that the outer arms of the levers are so much the longer that the weight upon the same preponderates. By pushing the levers inward the difference in the length of the same is lessened and the springs counterbalance or nearly counterbalance the weight of the mirror, so that the latter can be easily lifted into position.

The slots $b$ are formed in the arms F because of the necessary play on account of the shorter radius of the outer arms of the levers G; but it will be evident that the slots $x$ may be long enough to permit all the play of the levers which may be necessary.

The arms F and levers G may be made of thin sheet metal, so as to fit snugly between the side bars of the frame B and the sides of the mirror-frame when the latter is in its normal position. The hanging device is thus rendered neat, cheap, and compact, and is, moreover, of such a character that it can be readily applied to ordinary bureaus without any material change in their construction, and as the pivots of the hanger are close to the base of the frame there is no injurious strain upon said frame, as there would be if the hanging device were at the top of the frame.

If desired, there may be but one spring-cord, centrally located, for acting on the drum H, or the rear ends of the levers G may be connected by a rod and the spring $m$ may act directly upon this rod, as shown, for instance, in Fig. 5, or springs may be connected directly to the levers G, or may even be dispensed with in some cases without departing from my invention, the construction shown in Figs. 1 to 4, however, being preferred.

Having thus described my invention, I wish it to be understood that I do not claim, broadly, a mirror hung so as to be drawn outward and downward from the frame of the bureau; but

I claim and desire to secure by Letters Patent—

1. The combination of the frame of a bureau or like article of furniture, a mirror adapted to said frame, and a hanging device consisting of arms pivoted to the mirror and to the frame and levers pivoted to said arms and to the frame and having longitudinal play at one set of pivots, all substantially as specified.

2. The combination of the frame of a bureau or like article of furniture, the mirror adapted to said frame, the hanger-arms pivoted to the mirror and to the lower portion of the frame, levers pivoted to said arms and to the lower portion of the frame, and one or more springs acting on said levers and serving to counterbalance the weight of the mirror, all substantially as specified.

3. The combination of the frame of a bureau or like article of furniture, the mirror adapted to said frame, the hanger-arms pivoted to the mirror and to the frame, levers pivoted to said arms and to the frame and having longitudinal play on the latter pivots, and one or more counterbalance-springs acting on the levers, all substantially as specified.

4. The combination of the frame of a bureau or like article of furniture, a mirror adapted to said frame, pivoted hanging devices at the opposite ends of the mirror, cords or chains connected to said hanging devices, a winding-drum for said cords or chains, and one or more springs acting on said drum and serving to wind up the cords or chains thereon, substantially as specified.

5. The combination of the frame of a bureau or like article of furniture, the mirror adapted to said frame, the hanger-arms pivoted to the mirror and to the frame, levers hung to said arms and to the frame, and catches whereby the arms are held in their upright or normal position, all substantially as specified.

In testimony whereof I have signed my name to this specification in the presence of two subscribing witnesses.

JOSEPH R. ANDERSON.

Witnesses:
WILLIAM D. CONNER,
HARRY SMITH.